United States Patent [19]

Iwama et al.

[11] Patent Number: 5,291,429
[45] Date of Patent: Mar. 1, 1994

[54] CIRCUIT FOR MATRIX CALCULATION OF DISCRETE COSINE TRANSFORMATION

[75] Inventors: Masahiro Iwama; Osamu Kawai, both of Kawasaki, Japan

[73] Assignee: Fujitsu Limited, Kawasaki, Japan

[21] Appl. No.: 845,934

[22] Filed: Mar. 6, 1992

[30] Foreign Application Priority Data

Mar. 8, 1991 [JP] Japan .................. 3-067703

[51] Int. Cl.⁵ .............................................. G06F 7/38
[52] U.S. Cl. .................................... 364/725; 364/754
[58] Field of Search ............... 364/725, 726, 754, 757, 364/736

[56] References Cited

U.S. PATENT DOCUMENTS

| | | | |
|---|---|---|---|
| 4,215,416 | 7/1980 | Muramatsu | 364/736 |
| 4,293,920 | 10/1981 | Merola | 364/725 |
| 4,719,588 | 1/1988 | Tatemichi et al. | 364/754 |
| 4,760,543 | 7/1988 | Lightenberg et al. | 364/725 |
| 4,791,598 | 12/1988 | Liou et al. | 364/725 |
| 4,821,224 | 4/1989 | Liu et al. | 364/725 |
| 4,829,465 | 5/1989 | Knauer et al. | 364/725 |
| 4,849,922 | 7/1989 | Riolfo | 364/725 |
| 4,894,713 | 1/1990 | Delogne et al. | 364/725 |
| 5,021,987 | 6/1991 | Chan et al. | 364/754 |
| 5,031,038 | 7/1991 | Guillemot et al. | 364/725 |
| 5,093,801 | 3/1992 | White et al. | 364/726 |

OTHER PUBLICATIONS

English Abstract of Japanese Unexamined Patent Publication (Kokai) No. 63-274280, Nov. 11, 1988.

*Primary Examiner*—Tan V. Mai
*Attorney, Agent, or Firm*—Staas & Halsey

[57] ABSTRACT

A circuit for a matrix calculation of the discrete cosine transformation includes a read only memory, multipliers, summing devices, registers, selectors and a control unit. The multiplication and the summing calculations, with regard to one input data, are successively carried out by using a plurality of transformation coefficients of discrete cosine transformation read from the read only memory, row elements of the matrix of discrete cosine transformation are obtained by carrying out, a number of times equal to the number of row elements, the processes successively updating the registers based on the result of the calculations, and all the row and column elements of the matrix of discrete cosine transformation are obtained by carrying out, a number of times equal to the number of column elements, the calculations.

4 Claims, 6 Drawing Sheets

| FIG. 3A |
|---------|
| FIG. 3B |

FIG. 3A

FIG. 3B $X_{11}d_{11} + \cdots + X_{81}d_{18} = y_{11}$
$X_{11}d_{21} + \cdots + X_{81}d_{28} = y_{21}$
$X_{11}d_{31} + \cdots + X_{81}d_{38} = y_{31}$
$X_{11}d_{41} + \cdots + X_{81}d_{48} = y_{41}$
$X_{11}d_{51} + \cdots + X_{81}d_{58} = y_{51}$
$X_{11}d_{61} + \cdots + X_{81}d_{68} = y_{61}$
$X_{11}d_{71} + \cdots + X_{81}d_{78} = y_{71}$
$X_{11}d_{81} + \cdots + X_{81}d_{88} = y_{81}$

CIRCUIT FOR MATRIX CALCULATION OF DISCRETE COSINE TRANSFORMATION

BACKGROUND OF THE INVENTION

1. Field of the Invention

The present invention relates to a circuit for a matrix calculation of the discrete cosine transformation (DCT). The circuit according to the present invention is used for an orthogonal transformation unit in a picture image processing device in a video transmission system. The circuit for a matrix calculation of the discrete cosine transformation is useful for high efficiency coding in a video transmission system.

2. Description of the Related Art

In general, the matrix calculation circuit of the discrete cosine transformation is constituted by, for example, 8 multipliers and 8 summing devices, the number of the multipliers is the same as the number of summing devices. Received input data $X_{11}$ is multiplied by transformation coefficients of the discrete cosine transformation $d_{11}, d_{21}, d_{31}, \ldots$ read from a read only memory for storing the transformation coefficients. The results of the multiplication $X_{11}d_{11}, X_{11}d_{21}, X_{11}d_{31}, \ldots$ are registered in registers connected to the summing devices.

The next received input data $X_{21}$ is multiplied by transformation coefficients of the discrete cosine transformation $d_{12}, d_{22}, d_{32}, \ldots$ read from the read only memory for storing the transformation coefficients. The results of the multiplication $X_{21}d_{12}, X_{21}d_{22}, X_{21}d_{32}, \ldots$ are added to the results of the preceding multiplication $X_{11}d_{11}, X_{11}d_{21}, X_{11}d_{31}, \ldots$ registered in the registers, and the results of the summation are stored in the registers to achieve a cumulative summation. The calculation is repeated 8 times to obtain the elements $y_{11}, y_{12}, \ldots y_{18}$ of the matrix. These calculations are further repeated 8 times to obtain all elements $y_{11}, y_{12}, \ldots y_{88}$ of the matrix. Thus, an $8 \times 8$ matrix calculation of the discrete cosine transformation $[Y]=[D]\times[X]$ is completed.

However, in said matrix calculation circuit of the discrete cosine transformation, it is necessary to provide a number of summing devices equal to the number of multipliers, and accordingly the scale of the circuit increases. Since a multiplier has a relatively large number of gates, the scale of the gate of the entire calculation circuit is increased, which causes an undesirable increase in scale for constituting a matrix calculation circuit of the discrete cosine transformation of the large scale integrated type circuit.

SUMMARY OF THE INVENTION

An object of the present invention is to provide an improved circuit for a matrix calculation of the discrete cosine transformation in which the number of multipliers and summing devices is reduced, the number of the gates of the calculation circuit is reduced, the scale of the calculation circuit is reduced, and accordingly an advantageous constitution of a matrix calculation circuit of the discrete cosine transformation of the large scale integrated circuit is attained.

In accordance with the present invention, there is provided a circuit for a matrix calculation of the discrete cosine transformation including a read only memory for storing the transformation coefficients of discrete cosine transformation; multipliers for multiplying received data by the transformation coefficients of discrete cosine transformation read from the read only memory; summing devices for summing the result of the multiplication of the result of the summation; selectors connected to the registers for selecting the outputs of the registers; and a control unit coupled to the registers and the selectors for controlling the selection of the inputs of the registers and controlling the selection of the outputs of the selectors. The multiplication and the summing calculations, with regard to one input data, are successively carried out by using a plurality of transformation coefficients of discrete cosine transformation read from the read only memory; row elements of the matrix of discrete cosine transformation are obtained by carrying out, a number of times equal to the number of row elements, the processes of successively updating said registers based on the result of the calculations; and the row and column elements of the matrix of discrete cosine transformation are obtained by carrying out, a number of times equal to the number of column elements, the calculations.

DESCRIPTION OF THE PREFERRED EMBODIMENTS

Before describing the preferred embodiments, a picture image processing device in a video transmission system for which a circuit for a matrix calculation of the discrete cosine transformation according to the present invention is used as an orthogonal transformation unit will be explained with reference to FIG. 1. The picture image processing device shown in FIG. 1 is constituted by a subtracter 11, an orthogonal transformation member 12, a quantization member 13, a Huffman coding member 14, an inverse quantization member 15, an inverse orthogonal transformation member 16, an adder 17, and a frame memory 18.

Figure 1:
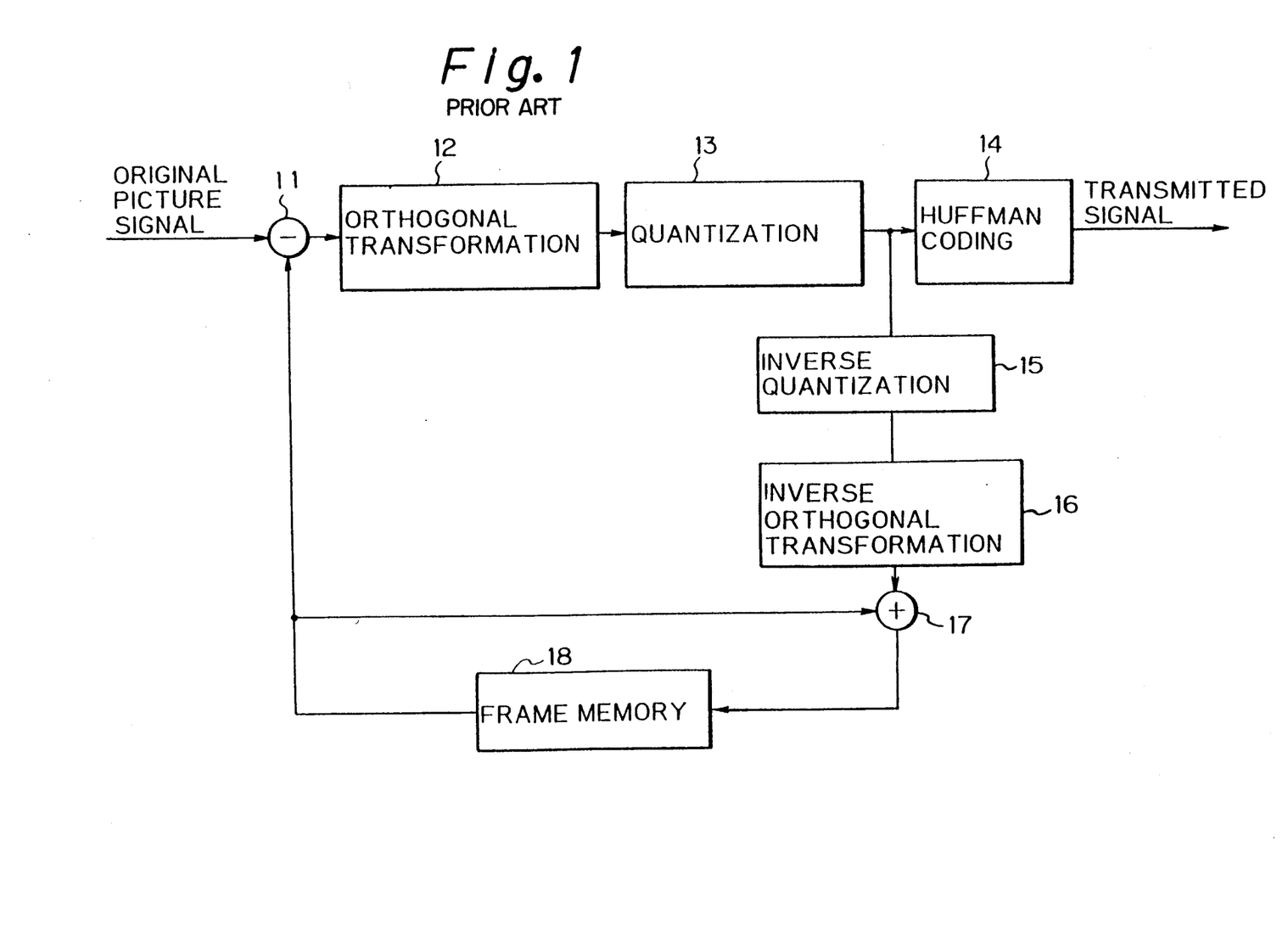
FIG. 1 shows a picture image processing device in a video transmission system for which a circuit for a matrix calculation of the discrete cosine transformation according to the present invention is used as an orthogonal transformation unit.

A circuit for a matrix calculation of the discrete cosine transformation according to the present invention is useful as the orthogonal transformation member 12 in the device of FIG. 1.

In general, in the matrix calculation of the discrete cosine transformation, a multiplication of a matrix of difference data;

by a matrix of a transformation coefficient of the discrete cosine transformation;

$$\begin{bmatrix} d_{11} & d_{12} & d_{13} \\ d_{21} & d_{22} & d_{23} \\ d_{31} & d_{32} & d_{33} \end{bmatrix}$$

is carried out to produce a matrix of the transformed data:

$$\begin{bmatrix} y_{11} & y_{12} & y_{13} \\ y_{21} & y_{22} & y_{23} \\ y_{31} & y_{32} & y_{33} \end{bmatrix} = \begin{bmatrix} d_{11} & d_{12} & d_{13} \\ d_{21} & d_{22} & d_{23} \\ d_{31} & d_{32} & d_{33} \end{bmatrix} \times \begin{bmatrix} x_{11} & x_{12} & x_{13} \\ x_{21} & x_{22} & x_{23} \\ x_{31} & x_{32} & x_{33} \end{bmatrix}$$

In accordance with the matrix calculation of the discrete cosine transformation, the data of events on the time axis of a co-ordinate are transformed into the data on the frequency axis of a co-ordinate, and a compression of the bands of the data is achieved.

Figure 2:
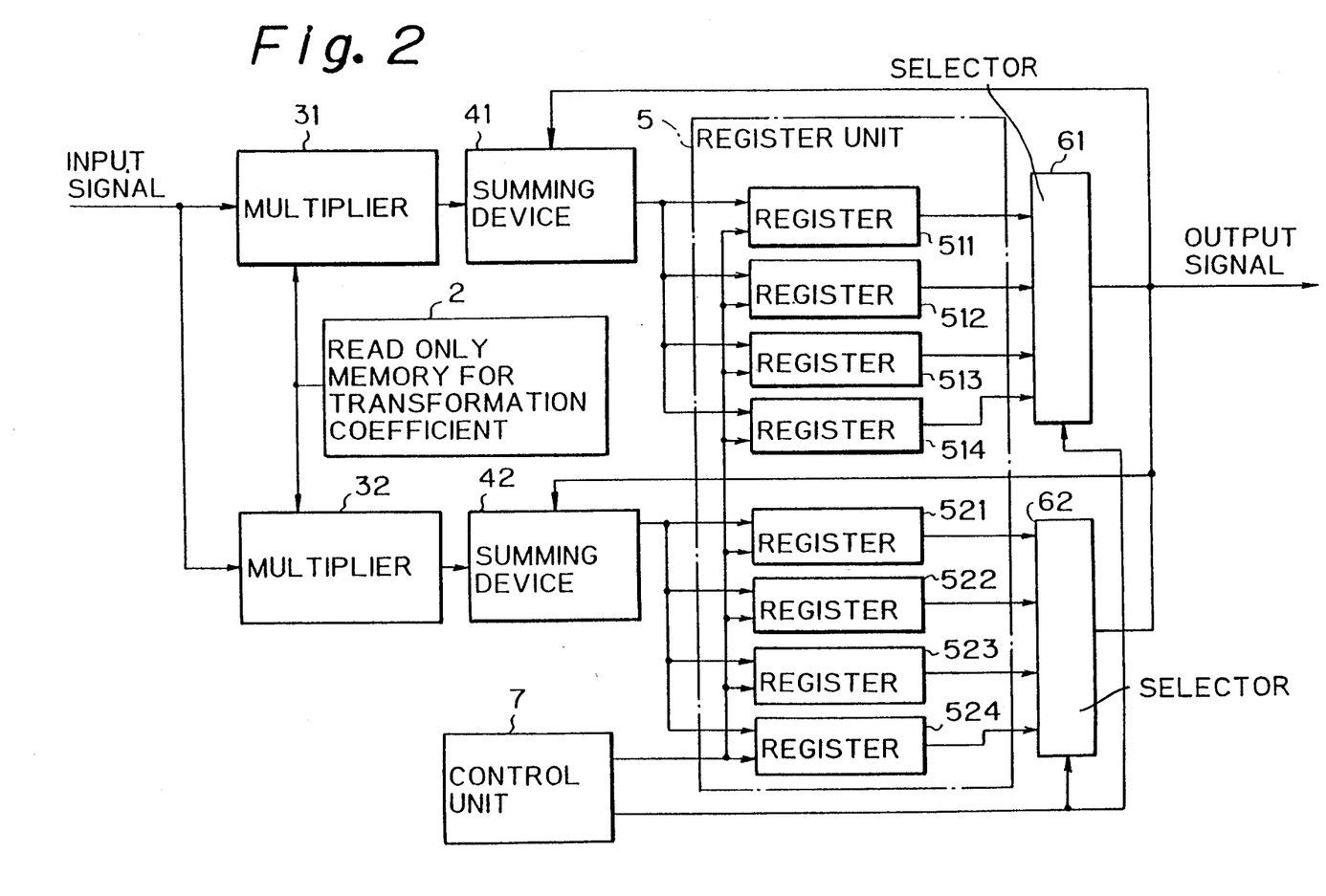
FIG. 2 is a schematic diagram of a circuit for a matrix calculation of the discrete cosine transformation according to an embodiment of the present invention.

A circuit for a matrix calculation waxing dimensions, for example, $8 \times 8$ of the discrete cosine transformation according to an embodiment of the present invention is shown in FIG. 2. The circuit of FIG. 2 is constituted by a read only memory 2 for the transformation coefficient, multipliers 31 and 32, summing devices 41 and 42, a register unit 5 including registers 511 to 514 and 521 to 524, selectors 61 and 62, and a control unit 7.

The read only memory 2 for the transformation coefficient stores the transformation coefficients for the discrete cosine transformation.

Figures 3, 3A:
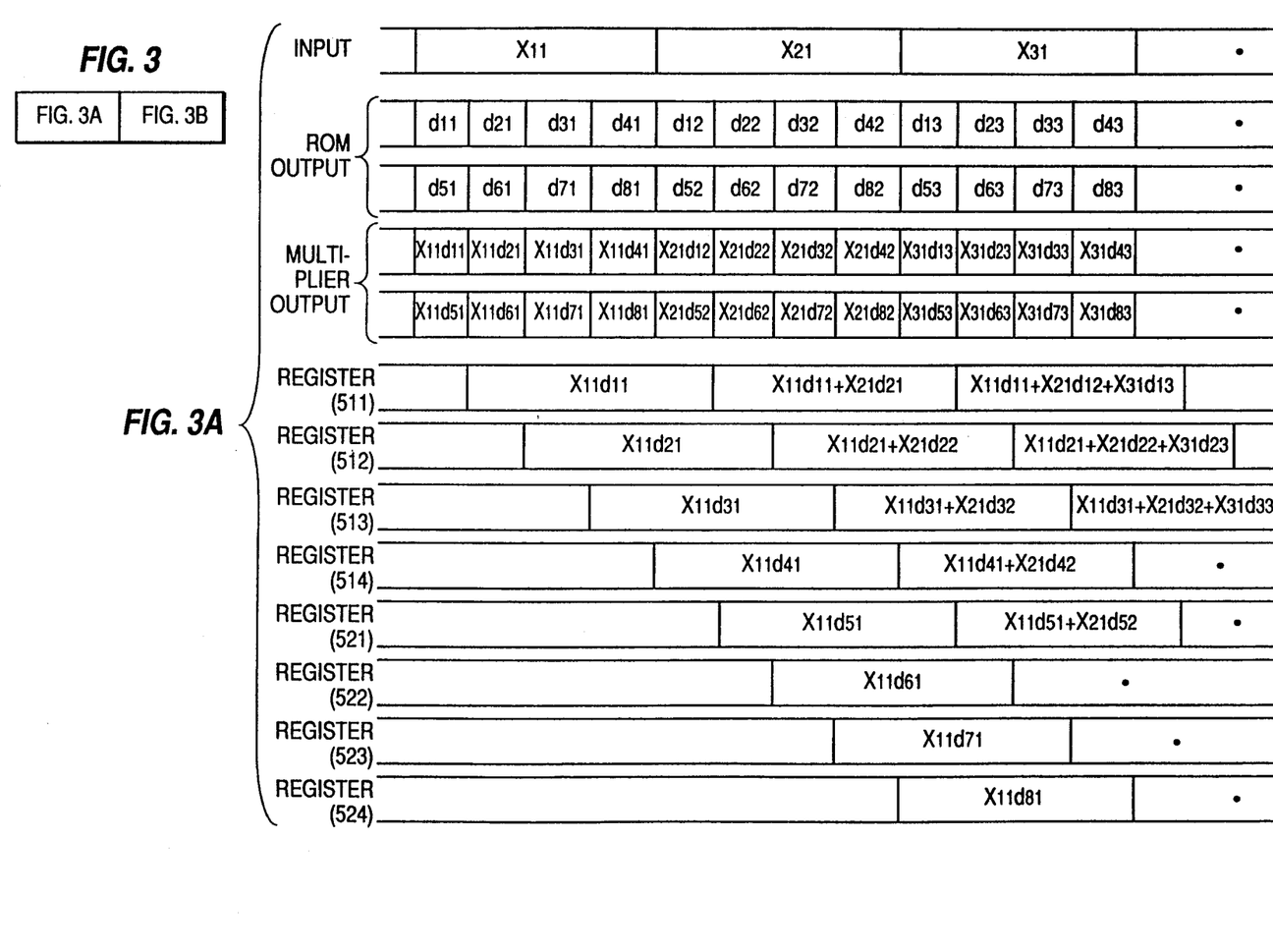
FIG. 3 is a diagram illustrating the positional orientation of FIGS. 3A and 3B.
FIGS. 3A and 3B illustrate sequences of the input signal, the output of the ROM, the output of the multipliers, and the data registered in the registers in the operation of the circuit of FIG. 2.
Figure 3B:
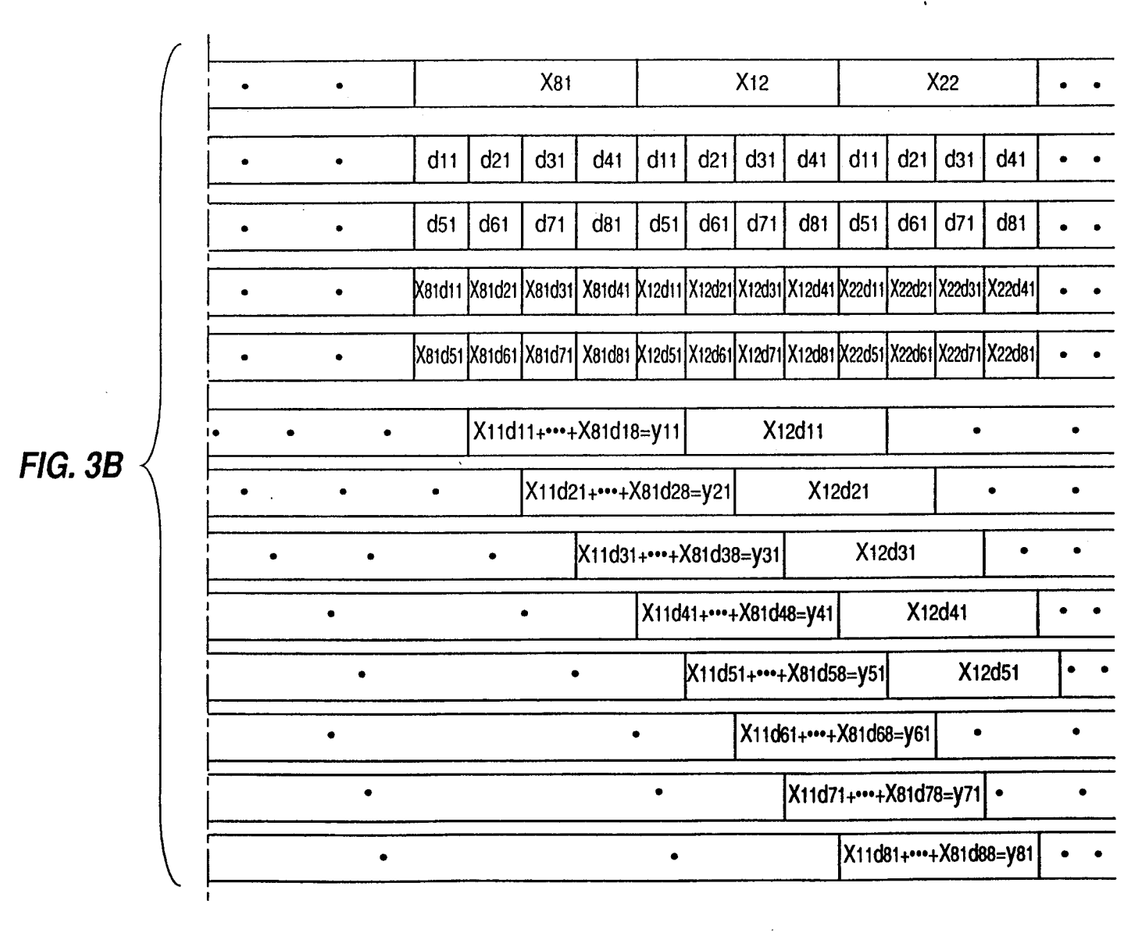

An example of sequences of the input signal, the output of the ROM 2, the output of the multipliers 31 and 32, the data registered in the registers 511, 512, . . . 524 in the operation of the circuit of FIG. 2 is illustrated in FIGS. 3A & 3B.

In each of the multipliers 31 and 32, a multiplication of the received input signal $X_{11}, X_{21}, X_{31} \ldots$ by the transformation coefficient $d_{11}, d_{21}, d_{31}. \ldots$ is carried out. In each of the summing devices 41 and 42, a summation of the outputs $X_{11}d_{11}, X_{11}d_{21}, X_{11}d_{31}, \ldots$ of the multiplier is carried out.

The transformation coefficients are read from the read only memory 2 at a speed four times the speed of receiving the input signals.

The enable signals supplied to the registers 511, 512 . . . 524 are controlled by the control unit 7. In accordance with the thus supplied enable signals, the outputs of the summing devices 41 and 42 are registered in the registers 511, 512, . . . 524.

In the register 511, the results of the summation $x_{11}d_{11}, x_{11}d_{11}+x_{21}d_{12}, x_{11}d_{11}+x_{21}d_{12}+x_{31}d_{13}, \ldots$ in the summing device 41 are registered. In register 512, the results of the summation $X_{11}d_{21}, X_{11}d_{21}+x_{21}d_{22}, x_{11}d_{21}+x_{21}d_{22}+x_{31}d_{23}. \ldots$ in the summing device 41 are registered. In register 513, the results of the summation $x_{21}d_{32}, x_{11}d_{31}+x_{21}d_{32}+x_{31}d_{33}$ in the summing device 41 are registered.

When the next input data $X_{21}$ is received, the selectors 61 and 62 are controlled by the control unit 7, the additions $x_{11}d_{11}+x_{21}d_{12}, x_{11}d_{21}+x_{21}d_{22}, x_{11}d_{31}+x_1d_{32}, \ldots$ are carried out by the summing devices 41 and 42, and the results of the additions are registered in the registers 511, 512, . . . 524. Similar calculations are repeated 8 times to obtain elements $y_{11}, y_{21}, \ldots y_{81}$ of the product matrix [Y]. These calculations are further repeated 8 times to obtain all elements of the product matrix, and thus the matrix calculation $[Y] = [D] \times [X]$ is completed.

In accordance with the circuit of FIG. 2, it is possible to reduce the number of multipliers and summing devices necessary for the matrix calculation, to reduce the circuit scale, to reduce the number of gates, and accordingly to provide an advantageous circuit structure for a matrix calculation of the discrete cosine transformation of the large scale integrated circuit.

Figure 4:
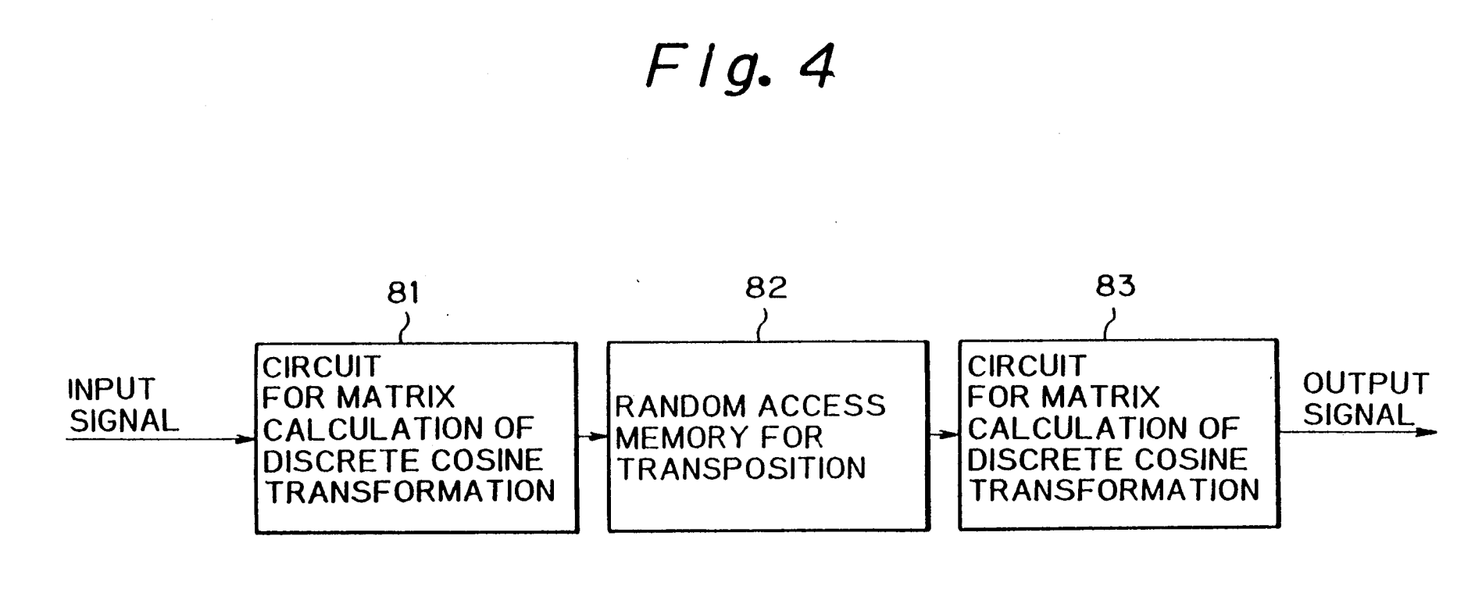
FIG. 4 shows a circuit for a matrix calculation of the discrete cosine transformation according to another embodiment of the present invention using a random access memory for transposition.

A circuit for a matrix calculation of the discrete cosine transformation according to another embodiment of the present invention is shown in FIG. 4. The circuit of FIG. 4 is constituted by circuits 81 and 83, each for a matrix calculation of the discrete cosine transformation and a random access memory 82 for transposition interposed between the circuits 81 and 83. Each of the circuits 81 and 83 is the same as the circuit for a matrix calculation of the discrete cosine transformation shown in FIG. 2.

In the circuit of FIG. 4, a one-dimensional matrix calculation of the discrete cosine transformation is carried out in the circuit 81, and the result of the calculation is supplied to the random access memory 82 for transposition. In the random access memory 82, the row elements are transposed by the column elements of the matrix, and the produced transposed matrix is supplied to the circuit 83 for a matrix calculation of the discrete cosine transformation. In the circuit 83, the matrix calculation for the supplied transposed matrix is carried out to produce a two-dimensional matrix of the discrete cosine transformation. The produced two-dimensional matrix is expressed as $[Y] = [D][D][X]^5$, where the symbol t represents a transposition operation. For example the transposition of the matrix consisting of elements a, b, c, d is expressed as follows.

$$\begin{bmatrix} a & b \\ c & d \end{bmatrix}^t = \begin{bmatrix} a & c \\ b & d \end{bmatrix}$$

Figure 5:
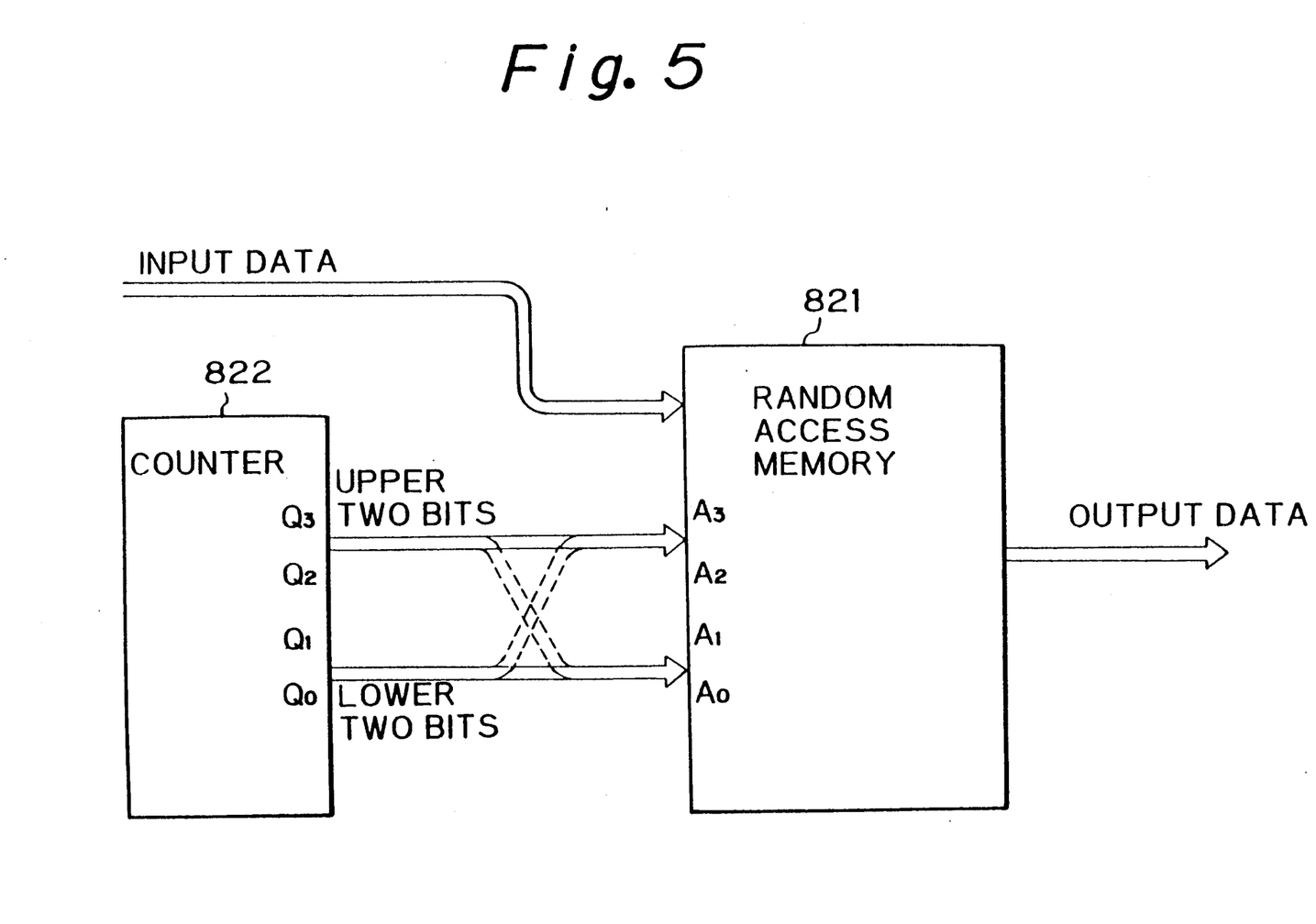
FIG. 5 shows an example of the arrangement of a random access memory for transposition.

An example of the arrangement of a random access memory for transposition is shown in FIG. 5. In the arrangement of FIG. 5, a random access memory 821 and a counter 822 are provided. The input bits $Q_3, Q_2, Q_1,$ and $Q_0 A_0$ of RAM 821 correspond to output bits $Q_3, Q_2, Q_1,$ and $Q_0$ of counter 822. The transmissions of the output of counter 822 to the input of RAM 821 are switched between the process of inputting data to RAM821 and the process of outputting data from RAM821. That is, from the process where the upper two bits $A_3$ and $A_2$ correspond to the upper two bits $Q_3$ and $Q_2$ and the lower two bits $A_1$ and $A_0$ correspond to the lower two bits $Q_1$ and $Q_0$ to the process where the upper two bits $A_3$ and $A_2$ correspond to the lower two bits $Q_1$ and $Q_0$ and the lower two bits $A_1$ and $A_0$ correspond to the upper two bits $Q_3$ and $Q_2$.

In accordance with the circuit of FIG. 4, it is possible to further increase the compression rate of the data.

We claim:

1. A circuit for a matrix calculation of a discrete cosine transformation, comprising:
   read only memory means for storing transformation coefficients of the discrete cosine transformation;
   multiplier means for multiplying received data by the transformation coefficients of the discrete cosine transformation read from said read only memory means and for outputting multiplication results;
   summing means for summing the multiplication results received from said multiplier means and for outputting a sum result;
   registers connected to said summing means and storing the sum result received from said summing means;
   selectors connected to said registers and selecting outputs of said registers; and
   a control unit coupled to said registers and said selectors, controlling selection of inputs of said registers and controlling selection of outputs of said selectors,
   wherein multiplication and summing calculations with regard to one input data, are successively performed by said multiplier means and summing means using the transformation coefficients of the discrete cosine transformation read from said read only memory means,
   wherein row elements of a matrix of the discrete cosine transformation are obtained by performing, a first number of times equal to a row number of the row elements, processes successively updating said registers based on said multiplication and summing calculations, and
   wherein all the row and column elements of the matrix of the discrete cosine transformation are obtained by performing, a second number of times equal to a column number of the column elements, said multiplication and summing calculations.

2. A circuit according to claim 1, wherein said multiplier means, said summing means, said registers and said selectors comprise calculation circuits, and
   the row and column elements of the matrix of the discrete cosine transformation are obtained by performing the multiplication and summing calculations by dividing the transformation coefficients read from the read only memory means.

3. A circuit according to claim 2,
   wherein said matrix comprises a one-dimensioned matrix, and
   wherein the circuit further comprises:
   a random access memory connected to the circuit and transposing the row elements and the column elements of the one-dimensioned matrix of the discrete cosine transformation received from the circuit producing a transpositioned matrix of the discrete cosine transformation; and
   a calculation circuit connected to said random access memory and performing a matrix calculation of the discrete cosine transformation to the transpositioned matrix of the device cosine transformation received from said random access memory producing a two-dimensional matrix of the discrete cosine transformation.

4. A circuit according to claim 1,
   wherein said matrix comprises a one-dimensional matrix, and
   wherein the circuit further comprises:
   a random access memory connected to the circuit and transposing the row elements and the column elements of the one-dimensional matrix of the discrete cosine transformation received from the circuit producing a transpositioned matrix of the discrete cosine transformation; and
   a calculation circuit connected to said random access memory and performing a matrix calculation of the discrete cosine transformation to the transpositioned matrix of the discrete cosine transformation received from said random access memory producing a two-dimensional matrix of the discrete cosine transformation.

* * * * *

UNITED STATES PATENT AND TRADEMARK OFFICE
CERTIFICATE OF CORRECTION

PATENT NO. : 5,291,429
DATED : March 1, 1994
INVENTOR(S) : Iwama et al.

It is certified that error appears in the above-indentified patent and that said Letters Patent is hereby corrected as shown below:

Col. 2, line 2, before "summation" insert --calculation in the preceding timing; registers connected to the summing devices for registering the result of the--.

Col. 3, line 29, "waxing" should be --having--;
line 65, before "in" insert --,...--.

Col. 4, line 1, "$x_1d_{32}$," should be --$x_{21}d_{32}$,--;

line 40, "$[Y]=[D][D][X]^5$" should be

--$[Y]=[D]|[D][X]|^t$--;

line 52, "$Q_3$" should be --$A_3$--; and "$Q_2$" should be --$A_2$--;
line 53, "$Q_1$" should be --$A_1$--; and "$Q_0$" should be deleted.

Signed and Sealed this

Twenty-third Day of August, 1994

Attest:

BRUCE LEHMAN

*Attesting Officer*  *Commissioner of Patents and Trademarks*